US007434567B2

(12) United States Patent
Bonnah, II

(10) Patent No.: US 7,434,567 B2
(45) Date of Patent: Oct. 14, 2008

(54) INTERNAL FILTER FOR A FUEL INJECTOR

(75) Inventor: Harrie William Bonnah, II, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/592,005

(22) Filed: Nov. 2, 2006

(65) Prior Publication Data

US 2007/0095953 A1 May 3, 2007

(30) Foreign Application Priority Data

Nov. 2, 2005 (EP) ................................. 05256796

(51) Int. Cl.
*B01D 35/02* (2006.01)
*F02M 59/46* (2006.01)

(52) U.S. Cl. ...................................... 123/467; 210/429

(58) Field of Classification Search ................. 123/467, 123/470, 468, 469; 210/429, 430, 439, 488; 239/585.1, 86
See application file for complete search history.

(56) References Cited

U.S. PATENT DOCUMENTS

| | | | | |
|---|---|---|---|---|
| 1,964,218 | A * | 6/1934 | Schargorodsky | 239/86 |
| 3,499,605 | A * | 3/1970 | Dreisin | 239/86 |
| 3,829,014 | A * | 8/1974 | Davis et al. | 239/86 |
| 5,335,863 | A * | 8/1994 | DeGrace | 239/575 |
| 5,829,688 | A * | 11/1998 | Rembold et al. | 239/585.1 |
| 5,937,887 | A * | 8/1999 | Baxter et al. | 137/15.18 |
| 6,036,120 | A * | 3/2000 | Varble et al. | 239/585.1 |
| 6,279,841 | B1 * | 8/2001 | McCormick | 239/585.1 |
| 6,283,389 | B1 * | 9/2001 | Hofmann | 239/533.11 |
| 6,732,959 | B2 * | 5/2004 | Delaney et al. | 239/585.1 |
| 6,910,642 | B2 * | 6/2005 | Maier | 239/585.1 |
| 2003/0052052 | A1 * | 3/2003 | Boast et al. | 210/429 |
| 2003/0168532 | A1 * | 9/2003 | Maier | 239/587.1 |
| 2007/0057095 | A1 * | 3/2007 | Bayer et al. | 239/585.1 |
| 2007/0095745 | A1 * | 5/2007 | Sebastian | 210/439 |

* cited by examiner

*Primary Examiner*—Mahmoud Gimie
(74) *Attorney, Agent, or Firm*—Paul L. Marshall

(57) ABSTRACT

A fuel injector including a filter 30 provided within the tip portion 12 of the injector body 10, down stream of the fuel inlet port 14 and upstream of the spray aperture 14. The filter 30 is in the form of a hollow truncated cone with a base region 32 having an outer diameter dimensioned to be a press fit against the inner sides of the tip portion 12 such that the filter is a press fit within the tip portion. The top or upper region of the cone terminates in an aperture 34 through which the pintle 16 passes, the aperture having an inner diameter dimensioned to be a close sliding fit over the pintle 16.

8 Claims, 1 Drawing Sheet

INTERNAL FILTER FOR A FUEL INJECTOR

TECHNICAL FIELD OF INVENTION

This invention relates to a fuel injector for an internal combustion engine and more particularly to a filter to be disposed internally of the fuel injector between the fuel inlet and the internal valve means of the fuel injector.

BACKGROUND OF INVENTION

It is known to provide a fuel injector with an external filter means disposed to filter the fuel before it enters the fuel inlet of the injector. Whilst such a filter can prevent particulate material in the fuel from entering the fuel injector, it is incapable of protecting the valve means of the fuel injector from damage or blockage by particulate material that may originate internally of the fuel injector, either due to processes used to manufacture and assemble the fuel injector or due to usage.

Accordingly, it is desirable to provide filter means within the fuel injector, downstream of the fuel inlet and upstream of the valve means thereof. However, internal filter means have not been successfully used due to the limited available space within the fuel injector body for the provision of filters and the requirement that filters should not affect the normal operation of the fuel injector by causing excessive restriction to the flow of fuel with the injector or by interfering with the moving parts of the fuel injector, in particular the pintle.

SUMMARY OF INVENTION

The present invention provides an internal filter for a fuel injector of an internal combustion engine, said filter comprising a body in the form of a hollow truncated cone comprising a base having an outer diameter dimensioned to be a press fit against the inner surface of a tip portion of the fuel injector and terminating in an aperture of reduced diameter through which a pintle of the fuel injector can pass with a close running clearance, at least one side region of the filter body being formed from filter material.

According to a second aspect of the present invention there is provided a valve group for a fuel injector of an internal combustion engine, said valve group comprising a body having an internal space communicating with a fuel inlet and an outlet aperture provided at a distal end of said body, a valve seat being provided at or adjacent said outlet aperture, a pintle extending within the internal space of said body, the pintle having a head engageable with the valve seat and being axially moveable between a first position wherein said head engages said valve seat and a second position wherein said head is spaced from said valve seat; wherein a filter is disposed within the internal space of said body of the valve group downstream of the fuel inlet and upstream of the valve seat, said filter comprising a body in the form of a hollow truncated cone having a base with an outer diameter dimensioned to be a press fit against the inner surface of the internal space of the body and terminating in an aperture of reduced dimension through which the pintle passes with a close running clearance, at least one side region of said body being formed from filter material.

Whilst the valve group is primarily intended for use with a fuel injector of an internal combustion engine, it may be applicable to a variety of other applications where it is required to dispense liquids, such as in medical applications wherein the removal of any particulate contamination from the liquid to be dispensed is of importance.

According to a third aspect of the present invention there is provided a fuel injector for an internal combustion engine, comprising an injector body having a fuel inlet and a tip portion defining a spray aperture and having a valve seat; a pintle extending within the tip portion, the pintle having a head engageable with the valve seat and being axially moveable between a first position wherein said head engages said valve seat and a second position wherein said head is spaced from said valve seat; resilient means biasing the pintle to said first position; actuating means for selectively moving the pintle into said second position; wherein a filter is disposed internally of the tip portion of the injector body downstream of the fuel inlet and upstream of the valve seat, said filter comprising a body in the form of a hollow truncated cone having a base with an outer diameter dimensioned to be a press fit against the inner surface of the tip portion and terminating in an aperture of reduced diameter through which the pintle passes with a close running clearance, at least one side region of said filter body being formed from filter material.

Preferred features and advantages of the invention will be apparent from the claims and from the following description.

BRIEF DESCRIPTION OF DRAWINGS

An embodiment of the invention will now be described, by way of example only, with reference to the drawings, in which.

DETAILED DESCRIPTION OF INVENTION

Figure 1:
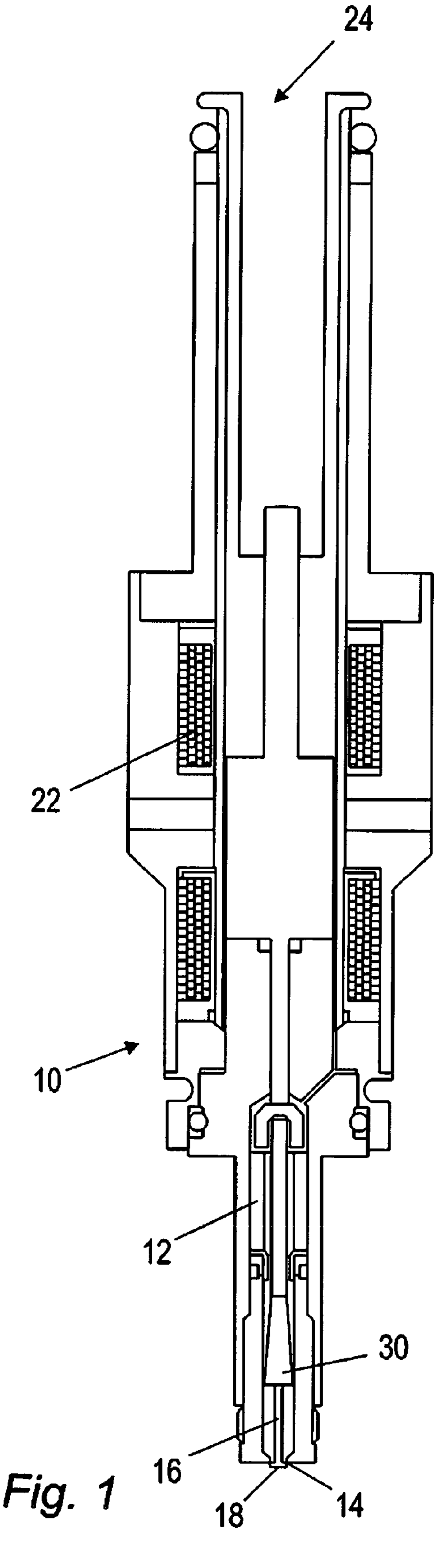
FIG. 1 is a cross-section of a fuel injector forming an embodiment of the present invention.

FIG. 1 shows a fuel injector of the outwardly opening type having an injector body 10, having a tip portion 12 terminating in a spray aperture 14. A pintle 16 extends within the tip portion 12 for axial movement therein between an extended position and a retracted position. The pintle 16 terminates in an external head portion 18 engageable with the spray aperture 14 when in its retracted position to seal the spray aperture 14. Resilient means (not shown) bias the pintle 16 to its retracted position and a selectively energisible and de-energisible electromagnetic actuator 22 is operable to selectively move the pintle 16 into its extended position to initiate a fuel injection operation. Pressurised fuel is supplied to the fuel injector via an inlet port 24.

Figure 3:
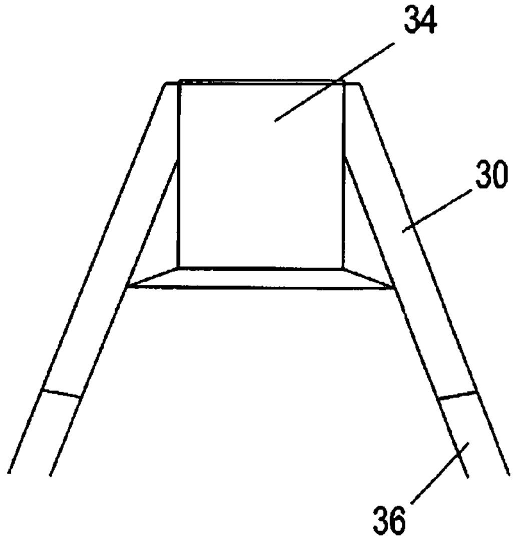
FIG. 3 is a cross-section of the upper region of the filter of FIG. 2.

As shown in FIG. 3, uppermost region of the frame of the filter is shaped such that the aperture 34 formed therein defines a cylindrical sealing surface through which the pintle is a close sliding fit, said surface having an axial extent or width substantially equal to or greater than the diameter of the aperture 34 to ensure a good seal against the outer surface of the pintle without causing significant resistance to the axial movement of the pintle through the aperture 34.

Figure 2:
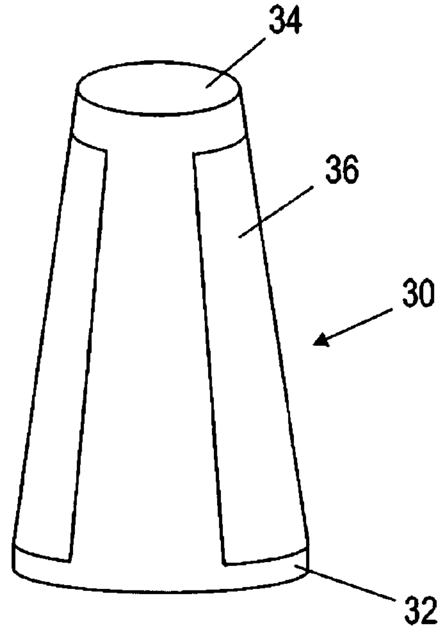
FIG. 2 is a perspective view of the filter of FIG. 1.

A filter 30 is provided within the tip portion 12 of the injector body 10, downstream of the fuel inlet port 14 and upstream of the spray aperture 14. As can be best seen from FIG. 2, the filter 30 is in the form of a hollow truncated cone with a base region 32 having an outer diameter dimensioned to be a press fit against the inner sides of the tip portion 12 such that the filter is a press fit within the tip portion. The top or upper region of the cone terminates in an aperture 34 through which the pintle 16 passes, the aperture having an inner diameter dimensioned to be a close sliding fit over the pintle 16.

The filter 30 is formed from a plastic frame having apertures in the side regions thereof within which apertures is mounted filter material 36 through which the fuel must pass to reach the spray aperture 14 when the filter is located within the tip portion 12 of the injector body 12. The filter material 36 is such that the filter 30 is capable of removing particulate material of 30 microns or more in size.

The filter 30 forms a barrier to the free flow of particle contaminated fuel. The filter can be pre-assembled to the valve group defined by the tip portion and its associated components prior to assembly into the remainder of the injector body. Thus the valve group can be cleaned and purged of all residual contamination prior to assembly into the injector body and then installed into the remainder of the injector body comprising the actuator parts. The filter, being in a completely cleaned valve group assembly, can effectively filter the contamination that may be generated during the assembly and test phase of the injector construction.

It is also envisaged that the cleaned and purged pre-assembled valve group assembly could be used in applications other than in fuel injectors, where high purity and particulate contamination free liquids are to be dispensed, such as medical applications.

The invention claimed is:

1. An internal filter for a fuel injector of an internal combustion engine, said filter comprising a body in the form of a hollow truncated cone comprising a base having an outer diameter dimensioned to be a press fit against the inner surface of a tip portion of the fuel injector and terminating in an aperture of reduced diameter through which a pintle of the fuel injector can pass with a close running clearance, wherein said base is the portion of the body located closest to the tip portion of the fuel injector, and further wherein said aperture is located at the end of the body opposite from the base.

2. A filter in accordance with claim 1, wherein the aperture formed therein defines a cylindrical sealing surface through which the pintle is a close sliding fit, said surface having an axial extent or width substantially equal to or greater than the diameter of the aperture to ensure a good seal against the outer surface of the pintle without causing significant resistance to the axial movement of the pintle through the aperture.

3. A filter as claimed in accordance with claim 1, wherein said filter comprises a frame having one or more regions of filter material provided in apertures or windows formed in the side regions thereof.

4. A filter in accordance with claim 3, wherein said frame comprises a lower portion, defining said base adapted to be a press fit within the injector tip, and an upper portion, defining said aperture through which the pintle passes, and a plurality of linking struts or members extending between said upper and lower portions to define a plurality of windows or openings having filter material mounted therein.

5. A filter in accordance with claim 3, wherein said frame is formed from a plastic material.

6. A valve group for a fuel injector of an internal combustion engine, said valve group comprising a body having an internal space communicating with a fuel inlet and an outlet aperture provided at a distal end of said body;

a valve seat provided at or adjacent said outlet aperture;

a pintle extending within the internal space of said body, the pintle having a head engageable with the valve seat and being axially moveable between a first position wherein said head engages said valve seat and a second position wherein said head is spaced from said valve seat; and a filter disposed within the internal space of said body of the valve group downstream of the fuel inlet and upstream of the valve seat, said filter comprising a body in the form of a hollow truncated cone comprising a base having an outer diameter dimensioned to be a press fit against the inner surface of a tip portion of the fuel injector and terminating in an aperture of reduced diameter through which the pintle of the fuel injector can pass with a close running clearance, wherein said base is the portion of the body located closest to the tip portion of the fuel injector, and further wherein said aperture is located at the end of the body opposite from the base.

7. A fuel injector for an internal combustion engine, comprising an injector body having a fuel inlet and a tip portion defining a spray aperture and having a valve seat;

a pintle extending within the tip portion, the pintle having a head engageable with the valve seat and being axially moveable between a first position wherein said head engages said valve seat and a second position wherein said head is spaced from said valve seat;

resilient means biasing the pintle to said first position;

actuating means for selectively moving the pintle into said second position; and a filter disposed internally of the tip portion of the injector body downstream of the fuel inlet and upstream of the valve seat, said filter comprising a body in the form of a hollow truncated cone comprising a base having an outer diameter dimensioned to be a press fit against the inner surface of the tip portion of the fuel injector and terminating in an aperture of reduced diameter through which the pintle of the fuel injector can pass with a close running clearance, wherein said base is the portion of the body located closest to the tip portion of the fuel injector, and further wherein said aperture is located at the end of the body opposite from the base.

8. A fuel injector as claimed in claim 7, wherein the fuel injector is an outwardly opening injector.

* * * * *